(12) United States Patent
Cassen et al.

(10) Patent No.: US 6,278,400 B1
(45) Date of Patent: Aug. 21, 2001

(54) DUAL CHANNEL MICROWAVE TRANSMIT/RECEIVE MODULE FOR AN ACTIVE APERTURE OF A RADAR SYSTEM

(75) Inventors: John W. Cassen, Sykesville; Edward L. Rich, III, Arnold; Gary N. Bonadies, Laurel; John S. Fisher, Ellicott City; John W. Gipprich, Millersville; John D. Gornto, Columbia; Daniel J. Heffernan, Pasadena; David A. Herlihy, Ellicott City; Scott C. Tolle, Baltimore; Patrick K. Richard, Baltimore; David W. Strack, Baltimore; Scott K. Suko, Elkridge; Timothy L. Eder, Glen Burnie, all of MD (US); Chad E. Wilson, Redmond, WA (US); Gary L. Ferrell, Pasadena, MD (US); Stephanie A. Parks, Virginia Beach, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/450,905

(22) Filed: Nov. 29, 1999

Related U.S. Application Data

(63) Continuation-in-part of application No. 09/158,829, filed on Sep. 23, 1998, now Pat. No. 6,114,986.

(51) Int. Cl.$^7$ ........................................................ G01S 7/28
(52) U.S. Cl. ........................... 342/175; 342/371; 342/372
(58) Field of Search ...................................... 342/175, 153, 342/154, 157, 158, 200, 201, 202, 368, 371, 372, 375; 343/700 MS, 777, 778, 824, 853

(56) References Cited

U.S. PATENT DOCUMENTS

| | | | |
|---|---|---|---|
| 5,745,076 | * 4/1998 | Turlington et al. | 342/372 |
| 5,854,610 | * 12/1998 | Wojtowicz et al. | 342/372 |
| 5,861,845 | * 1/1999 | Lee et al. | 342/375 |
| 5,940,031 | * 8/1999 | Turlington et al. | 342/372 |
| 6,005,531 | * 12/1999 | Cassen et al. | 343/853 |
| 6,094,161 | * 7/2000 | Cassen et al. | 342/175 |
| 6,114,986 | * 9/2000 | Cassen et al. | 342/175 |

* cited by examiner

Primary Examiner—John B. Sotomayor

(57) ABSTRACT

Two discrete transmit/receive (T/R) channels are implemented in a single common T/R module package having the capability of providing combined functions, control and power conditioning while utilizing a single multi-cavity, multi-layer substrate comprised of high or low temperature cofired ceramic layers. The ceramic layers have outer surfaces including respective metallization patterns of ground planes and stripline conductors as well as feedthroughs or vertical vias formed therein for providing three dimensional routing of both shielded RF and DC power and logic control signals so as to configure, among other things, a pair of RF manifold signal couplers which are embedded in the substrate and which transition to a multi-pin blind mate press-on RF connector assembly at the front end of the package. DC and logic input/output control signals are connected to a plurality of active circuit components including application specific integrated circuits (ASICs) and monolithic microwave integrated circuit chips (MMICs) via spring contact pads at the rear of the package. An RF connector assembly for coupling transmit and receive signals to and from the module is located at the front of the package. The RF transmit power amplifiers which generate most of the heat in the module package are located in a first pair of cavities formed in the substrate directly behind the RF connector assembly and are mounted directly on a pair of flat heat sink plates which are secured to the bottom of the substrate and acts as a thermal interface to an external heat exchanger such as a cold plate. A second pair of cavities in which are located the RF receive signal amplifiers and their respective receiver protector elements, is located beside the first pair of cavities directly behind the RF connector for reducing RF signal loss.

30 Claims, 10 Drawing Sheets

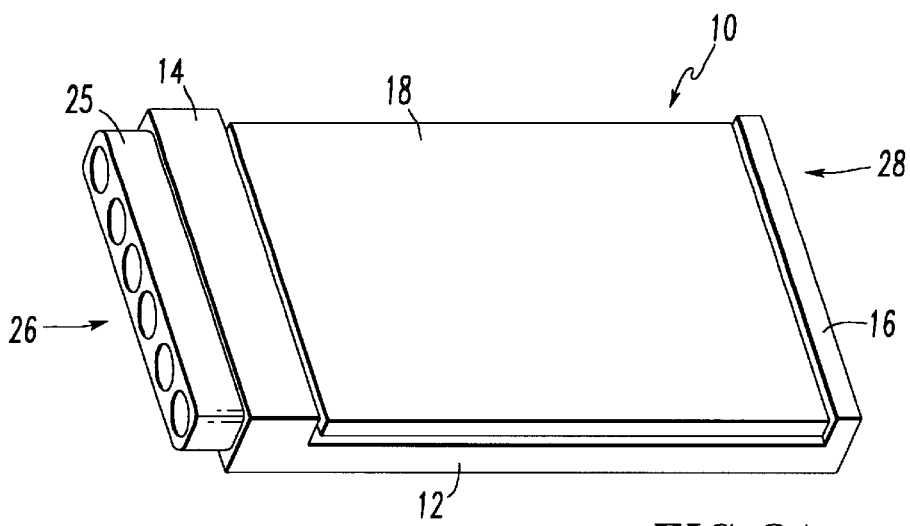
*FIG.2A*
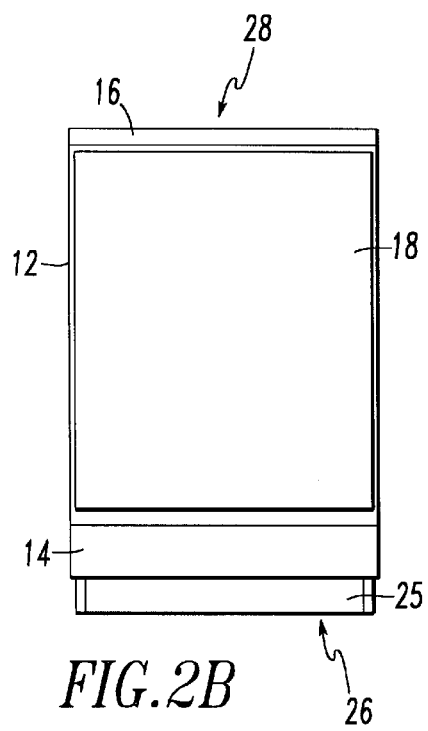
*FIG.2B*
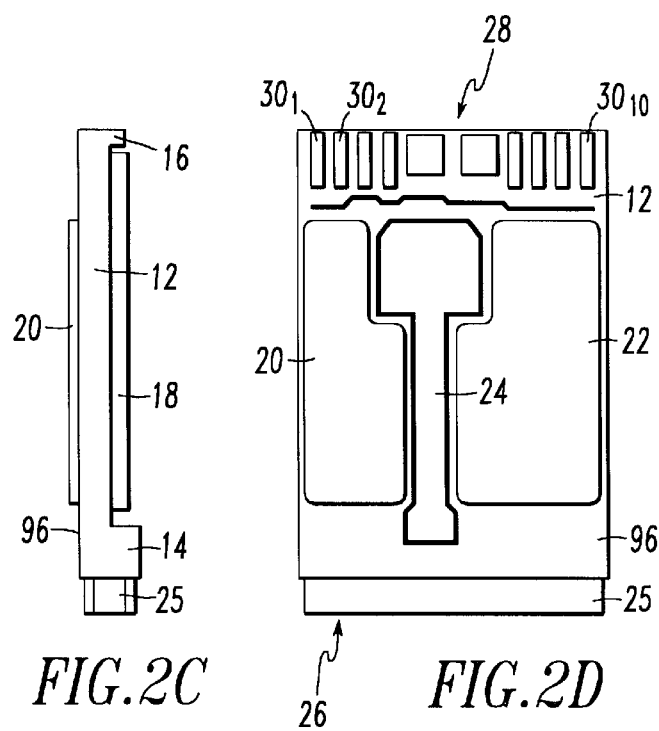
*FIG.2C*   *FIG.2D*

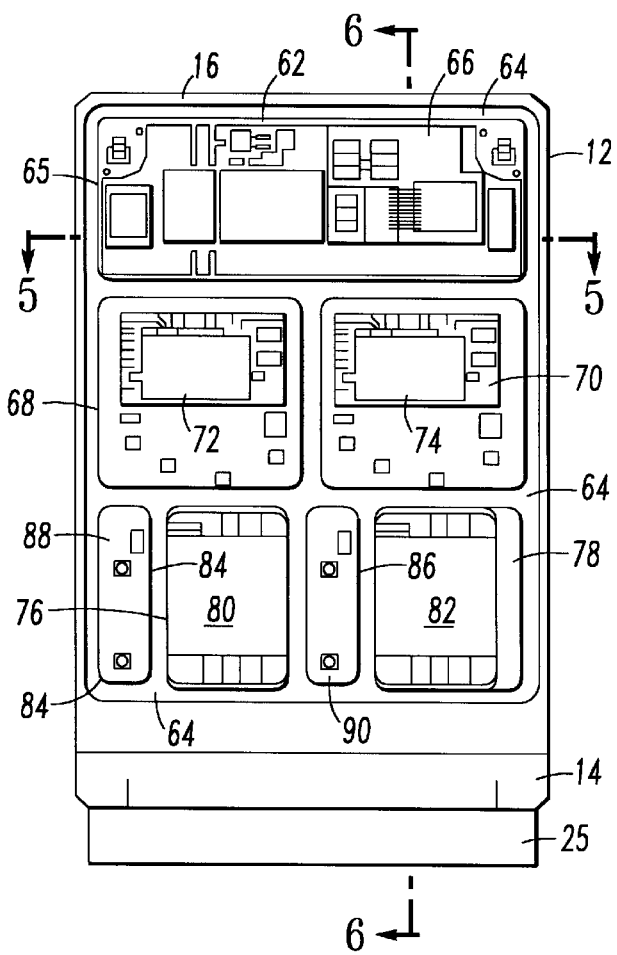
FIG.4A
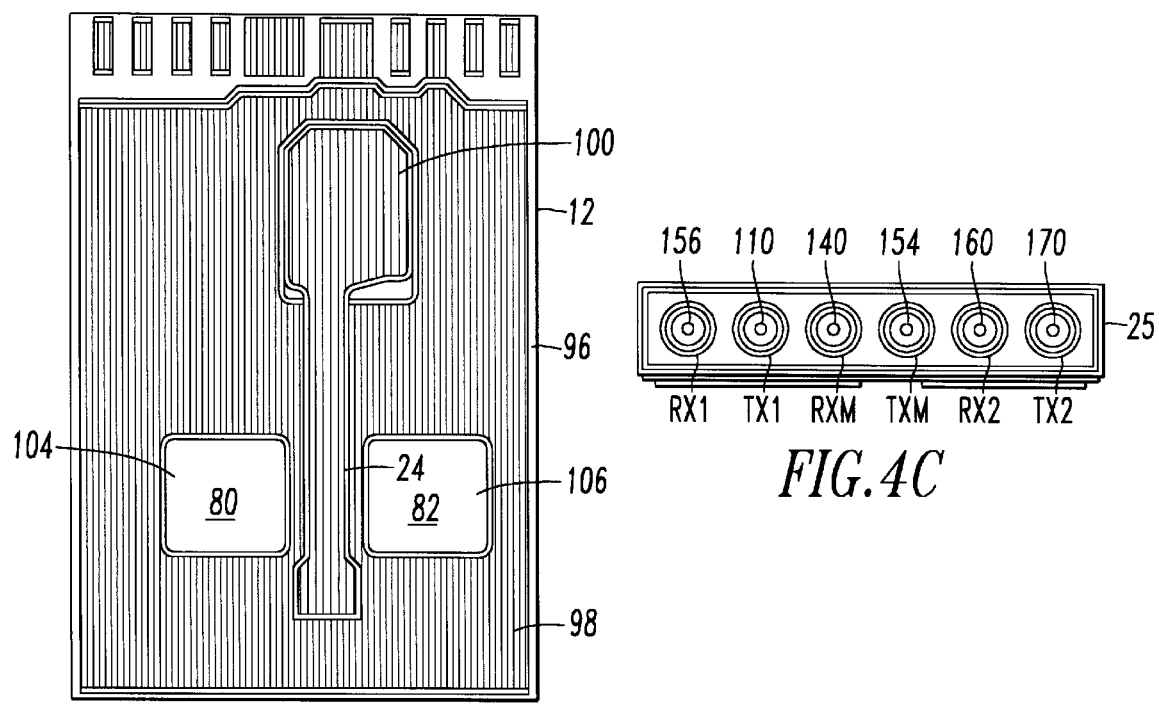
FIG.4B
FIG.4C

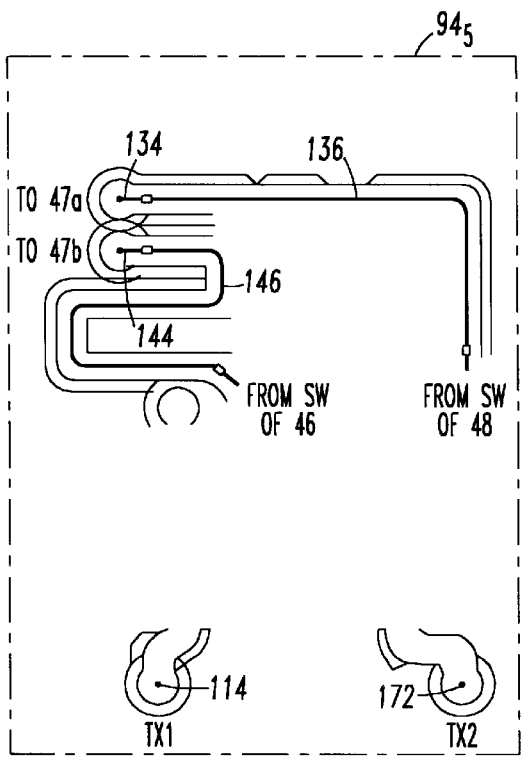
*FIG.12C*
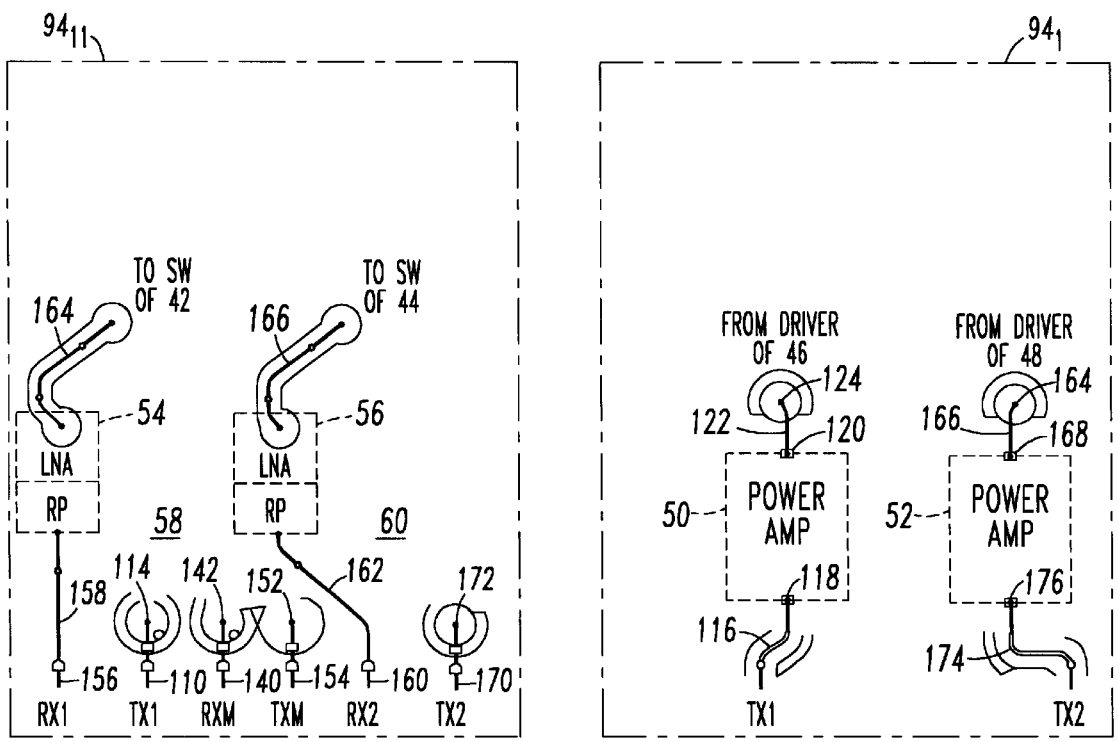
*FIG.12D*  *FIG.12E*

DUAL CHANNEL MICROWAVE TRANSMIT/ RECEIVE MODULE FOR AN ACTIVE APERTURE OF A RADAR SYSTEM

ORIGIN OF THE INVENTION

This is a Continuation in Part Application of U.S. application Ser. No. 09/158,829 entitled "A Dual Channel Microwave Transmit/Receive Module For An Active Aperture Of A Radar System", John W. Cassen et al., filed on Sep. 23,1998 now U.S. Pat. No. 6,114,986.

CROSS REFERENCE TO RELATED APPLICATIONS

This application is related to U.S. application Ser. No. 09/158,832 entitled, "Transmit/Receive Module Having Multiple Transmit/Receive Paths With Shared Circuitry", filed in the names of John W. Cassen et al on Sep. 23, 1998 now U.S. Pat. No. 6,034,633; and U.S. application Ser. No. 09/158,827 entitled "Antenna Assembly Including Dual Channel Microwave Transmit/ Receive Modules", filed in the names of John W. Cassen et al on Sep. 23, 1998 now U.S. Pat. No. 6,005,531.

Both of these applications are assigned to the assignee of this invention and, moreover, are intended to be incorporated herein by reference.

BACKGROUND OF THE INVENTION

1. Field of the Invention

This invention relates generally to transmit/receive (T/R) circuit modules utilized, for example, in phased array radar systems and, more particularly, to a dual channel T/R module where two discrete T/R RF signal channels are implemented side-by-side in a common package.

2. Description of Related Art

Phased array radars utilizing electronically scanned antenna arrays, also referred to as active apertures, require many individually controllable T/R modules which are arranged in an array. The T/R modules are connected to frontally located radiator elements which collectively generate a transmitted radar beam. The beam is normally energized, shaped and directed in azimuth and elevation under electronic control of the signals applied to the individual radiators.

A phased array radar system generates successive transmit pulses which are distributed through a transmit manifold and microwave circuitry to the various antenna radiators. Between transmit pulses, the radar system receives and processes successive return signals from the antenna radiators. The return signals are processed through microwave circuitry in the T/R module, collected through a receive manifold, and then processed in the system for target identification.

Such a radar system also employs a programmed digital processor to control amplification, attenuation, and phase shifting of transmit and receive signals, thereby determining the amplitude, direction, and shape of the aggregate RF energy beam transmitted by or received by the aperture. Different phase shifts cause different transmit or receive circuit delays in delivery of individual RF radiator signals to control the pattern of RF energy wavefronts associated with the different radiators and which are combined to define the direction and shape of a transmitted or received antenna beam.

Each T/R module according to the known prior art typically includes a housing structure or package including microwave signal processing means for processing transmitted and received radar signals, control signal processing means interconnected with microwave signal processing components for coupling control signals thereto; and power conditioning means comprising a number of power conditioning components selectively interconnected with the microwave signal processing components and the control signal processing components for providing electrical power thereto. Because such apparatus operates at relatively high power levels, there is also normally provided means for dissipating the heat generated by the various components, particularly the microwave power amplifiers and the power conditioning components associated therewith.

One known T/R module developed by the assignee of this invention is shown and described in U.S. Pat. No. 4,967,201, entitled, "Multi-Layer Single Substrate Microwave Transmit/Receive Module", granted to Edward L. Rich, III, on Oct. 30, 1990, one of the inventors named in this application. The module disclosed therein is referred to as a "sugar cube" T/R module and includes a single multi-layer substrate having at least two opposed mounting surfaces. The substrate includes a plurality of integrated dielectric layers, electrical conductors and thermal conductors selectively interconnected between the layers of the substrate. Microwave signal processing means is mounted on at least one of the mounting surfaces of the substrate for processing microwave radar signals. Control signal processing means is also mounted on at least one of the mounting surfaces of the substrate for providing control signals for the microwave signal processing means. Power conditioning means is additionally mounted on at least one of the mounting surfaces of the substrate for providing power to power the microwave signal processing means and control signal processing means. A heat sink interface is coupled to a set of thermal conductors or vias passing vertically through the substrate layers and which are positioned in thermal proximity to selected portions of the microwave signal processing means, the power conditioning means, and the control signal processing means for conducting thermal energy away from the heat generating elements mounted on the substrate to a heat sink.

The "sugar cube" module comprises a relatively early T/R module design in which basic transmit and receive functions, as then conceived, are embodied in a single modular T/R unit with the operating structure supporting such functions integrated together on a main substrate. While presumably operating as intended, certain inherent deficiencies have been found to exist. For example, while the "sugar cube" module exhibits a compact appearance, it embodies only a single T/R channel and is limited by its design to relatively low RF power output operation and is structurally limited to a single RF connection to an RF manifold. Also, while this type of module has a back-end plug-in capability for certain electrical connections, it has no easy plug-in capability for antenna connections. Instead, each module has an antenna radiator built into its front end, thereby creating installation problems in aligning misaligned radiators among installed T/R modules. This is due to the fact that transmitted and received beams require aligned antenna radiators to enable beam control in accordance with system commands.

Moreover, the module-integrated radiator of the "sugar cube" module limits bandwidth during transmission and reception and, because of its simple unpolarized patch structure, restricts radiator operation to a fixed polarization. The "sugar cube" T/R module is thus characterized with polarization inflexibility, whereas good system design requires polarization flexibility to permit variable settings of radiation properties including bandwidth and polarization. For example, if a received signal carries a high noise level in a particular polarization, it is desirable to have the flexibility to control the polarization to an angle where the noise is reduced. In this manner, the signal-to-noise ratio is enhanced and weaker signals can be detected with substantially reduced noise interference.

Further, in an antenna assembly employing "sugar cube" T/R modules, the pin within the single coaxial RF connector between each sugar cube module and the system manifold is susceptible to excessive axial movement in response to antenna mechanical vibrations. Such pin movements can change RF path lengths thereby causing increased noise level and erroneous phase changes which produce beam dispersion and thereby affect intended beam control.

Among other problems encountered with the "sugar cube" T/R module is the removal of heat generated by the active components therein. Thermal conductors, coursing vertically through the layered structure of the module to a heat transfer interface provides only limited heat transfer for removal of heat from the active circuit components. As a result, poor thermal performance contributes to a relatively low RF-power-output capability.

Following the "sugar cube" T/R module the assignee of this invention developed a T/R module which is disclosed in U.S. Pat. No. 5,745,076, entitled "Transmit/Receive Module For Planar Active Apertures", issued to Thomas R. Turlington et al on Apr. 28, 1998. The T/R module disclosed therein and referred to by the assignee as a "StackPak" (a registered trademark of the Northrop Grumman Corporation) comprises a module configuration which plugs into the backside of an active aperture and includes discrete RF, DC power and data distribution manifolds which are planar in configuration and are stacked together one on top of the other between a cold plate and an antenna assembly, with the antenna elements and circulators being assembled in a single physical unit which forms the front layer of the aperture.

The T/R module itself comprises a multi-chip microwave package comprised of multiple layers of high temperature cofired ceramic (HTCC) including ground planes, stripline, data and DC interconnects, thermal vias and RF inputs/outputs running through the RF assembly for a plurality of monolithic microwave integrated circuit chips (MMICs) which are located in cavities formed in the RF assembly layer. The module's architecture includes a single transmit/receive RF signal channel that shares its control functions of gain trim, phase shift and intermediate power amplification in both the transmit and receive modes of operation.

When "StackPak" T/R modules are installed in place, they are disposed against the cold plate for removal of internally generated heat. Each T/R module, moreover, has connector pins extending forwardly from a front module side to make all power, control and RF connections required for the module when it is installed by plugging into the back of the antenna assembly. The forwardly extending pins pass through respective sleeves which, in turn, extend through the stacked layers, thereby enabling the necessary connections to be made between the pins and the antenna radiators, the RF manifolds, and the control and power systems in the various layers.

The "StackPak" scheme thus resembles "Swiss cheese" in the sense that the sleeves pass through assembly openings to provide for the necessary DC power, DC digital control, and RF signal connections for the T/R modules.

In dissipating heat to a heat exchanger, a "StackPak" T/R module can use only a portion of its front surface for the dissipating heat transfer. Gallium arsenide integrated circuits are normally used for RF power amplification in T/R modules, and the temperature and reliability specifications for these devices require increasing heat dissipation for increasing power rating. Thus, "StackPak" T/R modules exhibit relatively poor heat dissipation, and consequently restrict RF power generation, largely because the frontal "real estate" of the T/R module must share heat transfer and electrical connection functions thereby operating with a highly restricted surface area for heat removal.

While the substrate-based structure of the "StackPak" employs cavities in an RF assembly layer for placement of various RF semiconductor devices to support RF circuitry in a single RF channel, there is no provision for semiconductor device layout or RF circuit routing and RF shielding and isolation between or among two or more discrete T/R channels.

The "StackPak" T/R module is furthermore hindered by limited capacity for interfacing DC power from an external power supply to the T/R module. Thus, in an active aperture, a low voltage bus normally supplies power to T/R modules from an external power supply, i.e., a DC converter which converts a main source voltage (such as 240V) to a low DC voltage (such as 10V or 11V) for module use. The weight of the low voltage DC (LVDC) bus increases in proportion to the square of the length of the bus path and in proportion to the square of the current carried by the LVDC. Increased RF output power requires increased transmit current pulses, which place increased peaking current demands on the input power supply circuitry, i.e., increased bus path cross-section and weight if increases in bus power losses and heat generation and high temperature are to be avoided. These principles also apply to any input LVDC path length connected to the external LVDC bus path and extending within the T/R module to power distribution points. However, the internal LVDC bus path length would normally be relatively short and have less significance to bus power loss and heat generation than the external LVDC bus would have. In accordance with good design practice, the LVDC bus structure desirably keeps losses at or below a specified percentage of RF power output as a control on efficiency in producing output RF output power. Thus, RF power output increases require significantly increased LVDC bus size and weight.

Thus, the design of the "StackPak" T/R module substantially affects the RF power output, since excessive bus size and weight is required to reach desirable levels of RF output power. Other factors including poor heat dissipation also limits RF output power in the "StackPak" design. Although the module can achieve some cost improvement through well known bonding techniques, it still carries cost disadvantages resulting from factors including the use of multiple housing/interconnect/sealpieces.

The "StackPak" T/R Module has since been improved by the development of the "TwinPak" (a trademark of the Northrop Grumman Corporation) T/R module and which is shown and described in the above noted parent application, U.S. application Ser. No. 09/158,829 entitled "A Dual Channel Microwave Transmit/Receive Module For An Active Aperture Of A Radar System." There a plurality, preferably two, discrete transmit/receive (T/R) channels are implemented in a single common package and having the capability of providing combined functions, control and power conditioning while utilizing a single multi-cavity, multi-layer substrate comprised of high temperature cofired ceramic (HTCC) layers. The ceramic layers have outer surfaces including respective metallization patterns of ground planes and conductors as well as feedthroughs or vertical vias formed therein for providing three dimensional routing of both RF and DC signals so as to configure, among other things, a pair of RF manifold signal couplers which are embedded in the substrate and which transition to an RF interface including a multi-pin RF connector assembly at the front end of the package. The RF signal paths are enclosed in electrical shielding formed by parallel lines of vias, underlying and overlying conductor elements. A DC and logic interface is located at the rear end of the package and includes means whereby DC power and control signals are connected to a plurality of active circuit components including application specific integrated circuit chips (ASICs) and monolithic microwave integrated circuit chips (MMICs) via external interface contacts. The MMICs, which include RF power amplification circuitry and generate most of the heat, are located in multi-level cavities formed in the substrate and are bonded directly to a generally flat heat sink plate which is secured to the bottom of the substrate and external heat exchanger in the form of a cold plate. DC power conditioning is also provided by a capacitive bank type of energy storage subassembly externally attached to the rear of the T/R module package for supplying supplementary power for peak power generation.

Notwithstanding the advances made in the art by the above-mentioned T/R modules, there is still an ongoing need for improvements, which result in reduced weight, cost and size, while at the same time maintaining required performance parameters.

SUMMARY

Accordingly, it is an object of the present invention to provide an improvement in microwave transmit/receive (T/R) modules.

It is another object of the present invention to provide an improvement in dual channel T/R modules used in connection with an active aperture of a pulse radar system.

It is a further object of the present invention to provide an improved dual channel T/R module utilized in a phased array radar system.

And it is yet a further object of the invention to provide an improved dual channel T/R module which results in enhanced heat dissipation while providing high channel isolation between a pair of discrete transmit/receive channels located side-by-side in a common package or housing structure.

These and other objects are achieved by a dual channel T/R module comprised of two transmit/receive (T/R) channels located in a common module package and having the capability of providing combined functions, control and power conditioning while utilizing a single multi-cavity, multi-layer substrate comprised of high temperature cofired ceramic (HTCC) layers. The ceramic layers have outer surfaces including respective metallization patterns of ground planes and conductors as well as feedthroughs or vertical vias formed therein for providing three dimensional routing of both RF and DC signals so as to configure, among other things, a pair of RF manifold signal couplers which are embedded in the substrate and which transition to an RF interface including a multi-pin RF connector assembly at the front end of the package. A DC and logic interface is located at the rear end of the package and includes means whereby DC power and control signals are connected to a plurality of active circuit components including application specific integrated circuit chips (ASICs) and monolithic microwave integrated circuit chips (MMICs) which are selectively connected together using chip-to-chip wedgebonding and conventional chip to substrate techniques. A pair of RF transmit power amplifiers which generate most of the heat, are located directly behind an RF connector assembly in cavities formed completely through the substrate and are mounted on a generally flat heat sink plate which is secured to the bottom of the substrate and acts as an efficient thermal interface to a cold plate type of external heat exchanger. A pair of low noise RF receive amplifiers are also now located directly behind the RF connector assembly in respective cavities adjacent the transmit power amplifiers so as to substantially reduce RF signal path losses.

BRIEF DESCRIPTION OF THE DRAWINGS

The present invention will become more fully understood when considered in conjunction with the accompanying drawings, which are provided for purposes of illustration only and thus are not meant to be considered in a limiting sense, and wherein:

FIGS. 2A–2D are prospective, top, side, and bottom plan views of a T/R module in accordance with the preferred embodiment of the invention;

FIGS. 4A–4E are top, bottom and front plan views of an unpopulated T/R module shown in FIGS. 2A–2D;

FIGS. 12A–12E are a set of electrical wiring diagrams illustrative of the individual RF signal paths of the wiring diagram shown in FIG. 11.

DETAILED DESCRIPTION OF THE INVENTION

Figure 1:
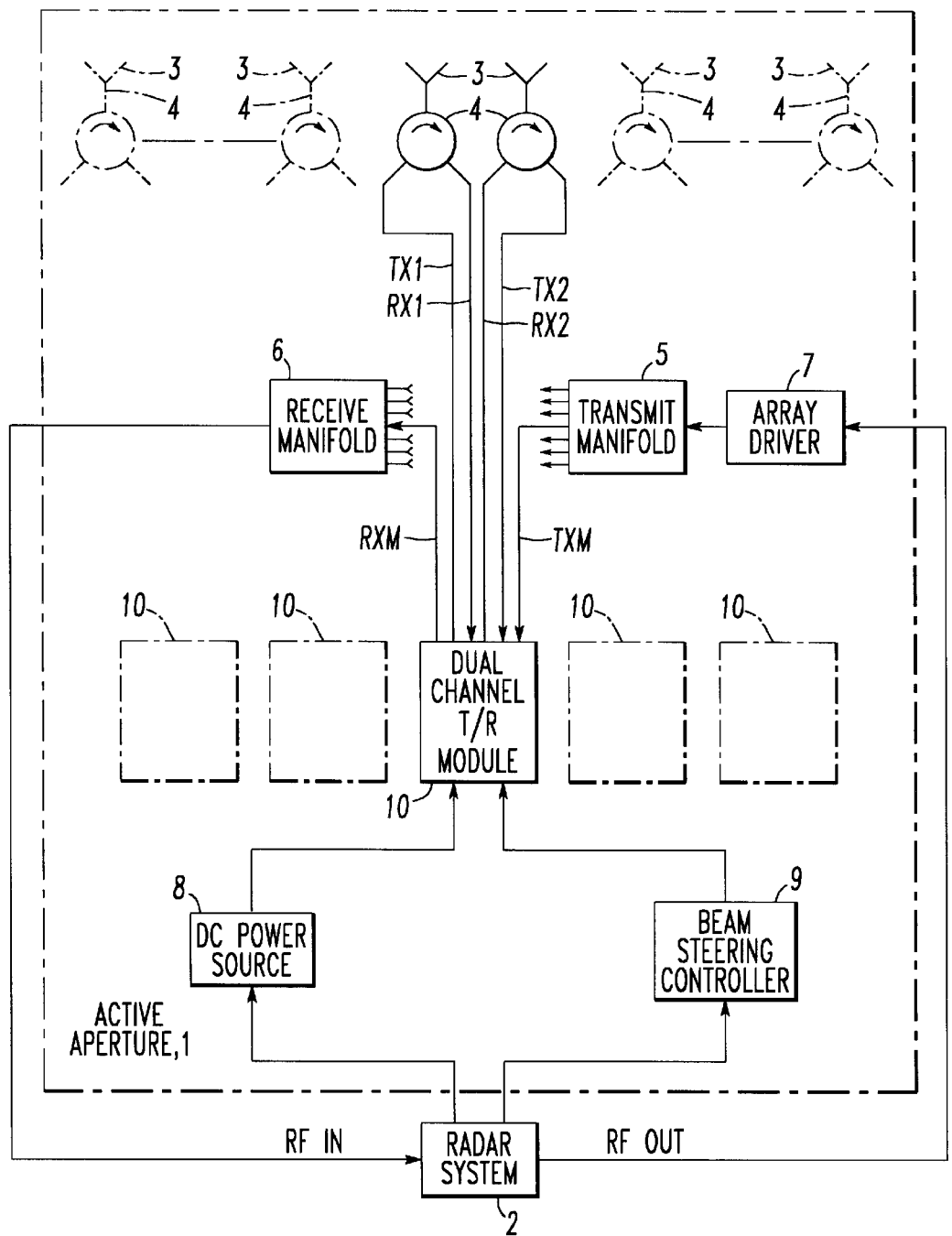
FIG. 1 is an electrical block diagram broadly illustrative of a phased array radar system including a plurality of identical T/R modules fabricated in accordance with the principles of the subject invention.

Referring now to the drawings and more particularly to FIG. 1, disclosed thereat is a block diagram broadly illustrative of an active aperture 1 for a radar system 2 including a plurality of phased array antenna elements 3 coupled to a plurality of dual channel T/R modules 10 by way of respective RF circulators 4. Each T/R module 10 includes a pair of RF transmit ports TX1 and TX2 and a pair of receive ports RX1 and RX2 connected to separate antenna elements 3 and circulators 4 for implementing two separate and distinct T/R channels embodied within one common T/R module 10. Both T/R channels, moreover, share a common input port TXM from a transmit manifold 5 and a common output port RXM to a receive manifold 6 which form part of a common RF manifold for the system. The combined output from the receive manifold 6 is fed to the receiver section, not shown, of the radar system 2. RF pulses generated for transmission are fed to the transmit manifold 5 via an array driver 7. The six RF input/output ports TX1, TX2, RX1, RX2, TXM and RXM define an RF interface for the T/R module 10. The module 10, moreover, receives DC power from a DC source 8 and beam steering control signals are received from a beam controller 9 via a power/logic interface. All of these subsystems are under the control of a one or more microprocessors, not shown, located in the radar system 2.

Considering now the details of the preferred embodiment of the invention, reference is first made to FIGS. 2A–2D. The T/R module 10 depicted in these figures exhibits an elongated relatively thin profile and implements a pair of discrete transmit/receive channels within a single common package similar to that shown and described in the above-referenced parent application, U.S. Ser. No. 09/158,829 as well as including a multi-layer substrate structure 12 comprised of a plurality of high temperature co-fired ceramic (HTCC) layers, to be described hereinafter, bonded together in a generally flat, rectangular configuration including a relatively wide front end portion 14 and a relatively narrow rear portion 16. While HTCC layers are preferred, when desirable the multi-layer substrate 12 can be fabricated using low temperature co-fired ceramic (LTCC) or other dielectric/conductor systems. The substrate 12 thus acts as a means for interconnecting a number of active and passive components which will also be described hereinafter for implementing a dual T/R function for a phased array radar system.

A flat rectangular metallized cover 18 fits over a metal sealing ring or frame, shown hereinafter, which is brazed to the top of the substrate 12 for forming a hermetically sealed package in addition to protecting the electronic components located within the substrate as well as providing RF shielding therefor. A pair of flat copper-molybdenum (CuMo) heat sink plates 20 and 22 are also attached to the bottom of the substrate 12 as shown in FIG. 2D while straddling an elongated buss bar 24. The heat sink plates 20 and 22 act as a thermal interface for spreading and transferring heat generated within the module 10 to an external heat exchanger, e.g. cold plate, not shown. At the forward end of the substrate 12, and as best shown in FIG. 2A, is an RF connector assembly 26 forming a microwave interface including a shroud 25 within which is located six(6) "blind mate" Gilbert press-on (GPPO) RF male connector pins and which can be easily plugged into the backside of an antenna array such as shown and described in related cross-referenced application Ser. No. 09/158,827 and acts as an interface for all RF signals coupled to and from the module 10.

All other electrical connections between the T/R module 10 and external apparatus supplying, for example, DC power and logic input/output (I/O) control signals, are made through a DC/logic interface 28 located at the rear end of the substrate 12. This interface 28 as shown in FIG. 2D includes a set of metallic spring contact pads $30_1$, $30_2$, . . . , $30_{10}$ located on the bottom of the substrate 12. A circuit board, not shown, forming part of DC power storage system and comprising a capacitive bank subassembly for supplying additional DC power to the module during peak power operation is also affixed to the rear end of the module 10. such an arrangement is shown in detail in the aforementioned parent application Ser. No. 09/158,829.

Figure 3:
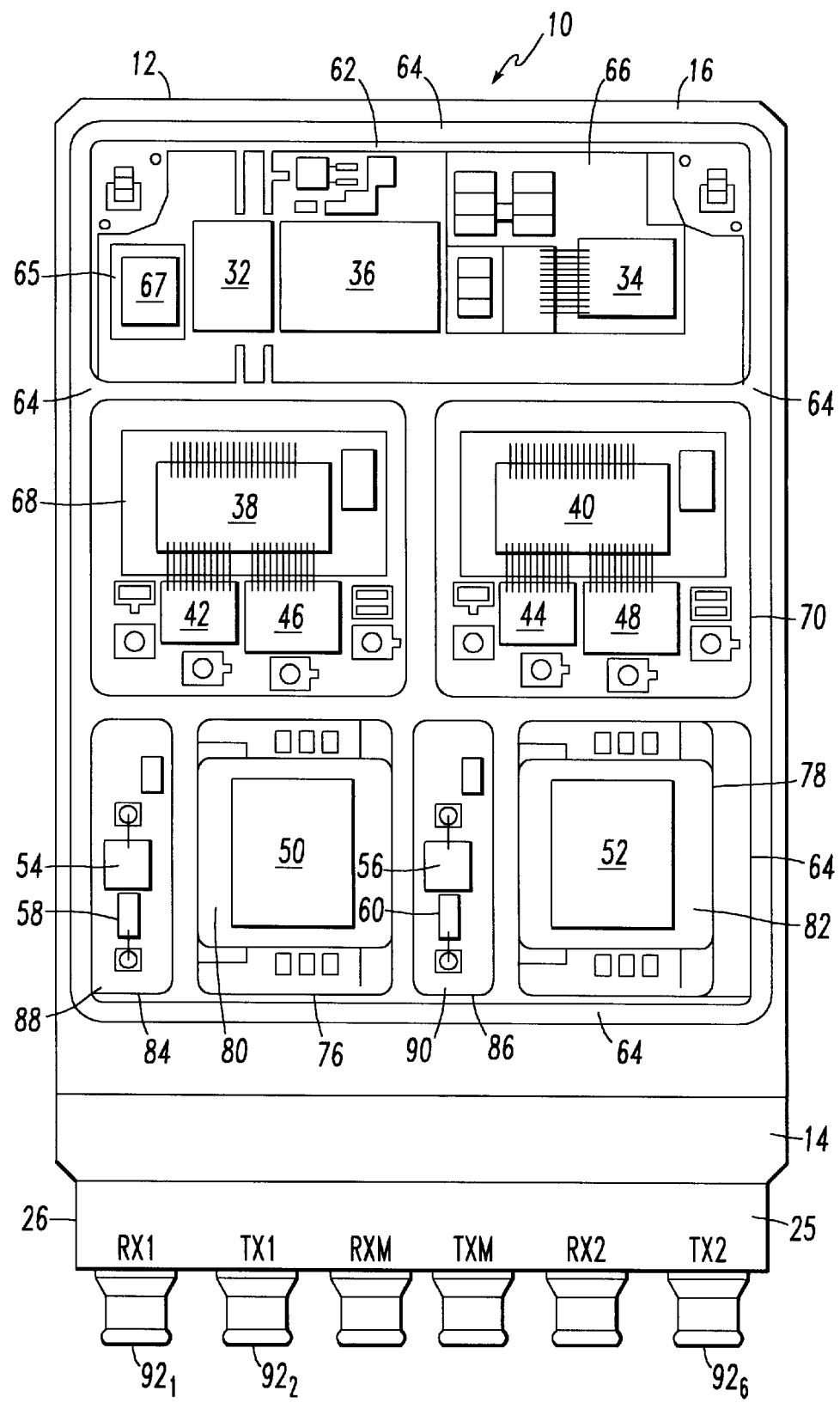
FIG. 3 is a top plan view of the interior of the T/R module shown in FIGS. 2A–2D and being populated with components of each functional subsystem located therein.

Considering now the other details of the subject invention, the "TwinPak" T/R module 10 as shown in FIG. 3 is populated with two sets of semiconductor integrated circuit chips, among other things, monolithic integrated circuits (MMICs) and application specific integrated circuits (ASICs) for implementing two separate and independent T/R channels within the same package. While two T/R channels are contemplated for the preferred embodiment of this invention, it is conceivable that more than two channels could be implemented, when desired.

FIG. 3, furthermore discloses a "TwinPak" T/R module 10 which has an improved layout of the circuit components within the module and including, a shared gate regulator 32, a FET switch 34, a power controller 36, two module controllers 38 and 40 including respective electrically erasable programmable read only memories (EEPROMs), two phase shifters 42 and 44, two combined switch/attenuator/driver amplifiers 46 and 48, two power amplifiers 50 and 52, two low noise amplifiers (LNAs) 54 and 56, and two receiver protectors (RPs) 58 and 60. These components are substantially the same as used with respect to the "TwinPak" T/R module shown and described in the parent application, U.S. Ser. No. 09/158,829; however, their relative positions within the confines of the module 10 are now changed in order to improve, among other things, signal strength of the radar return signals.

Figure 4D:
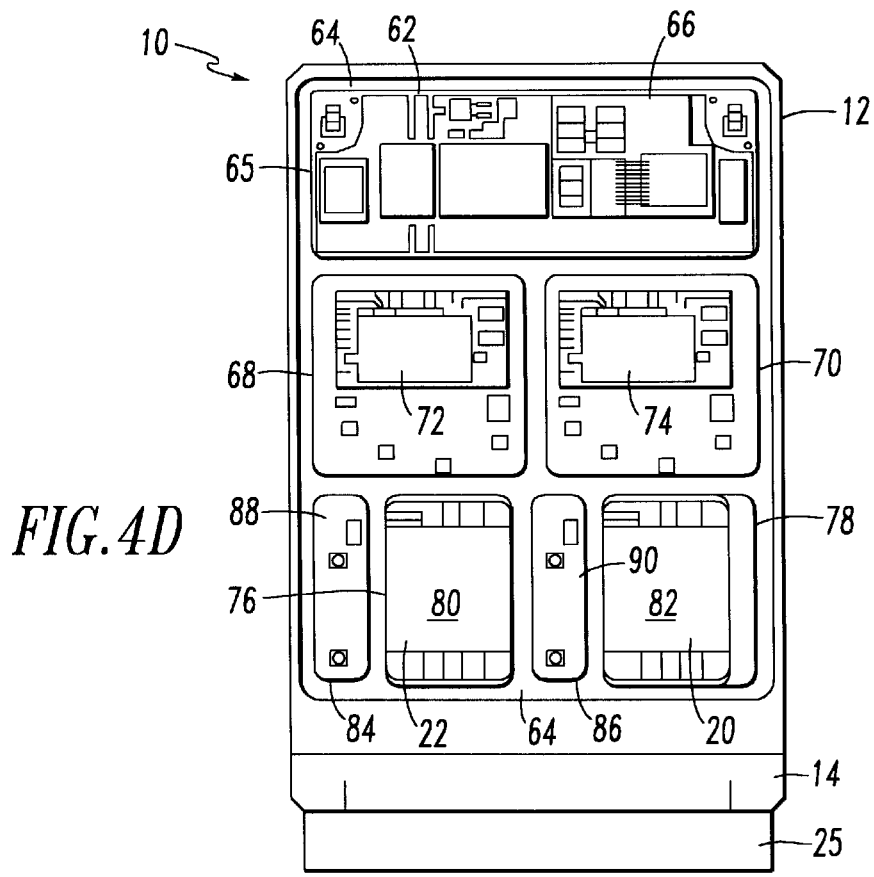
Figure 8:
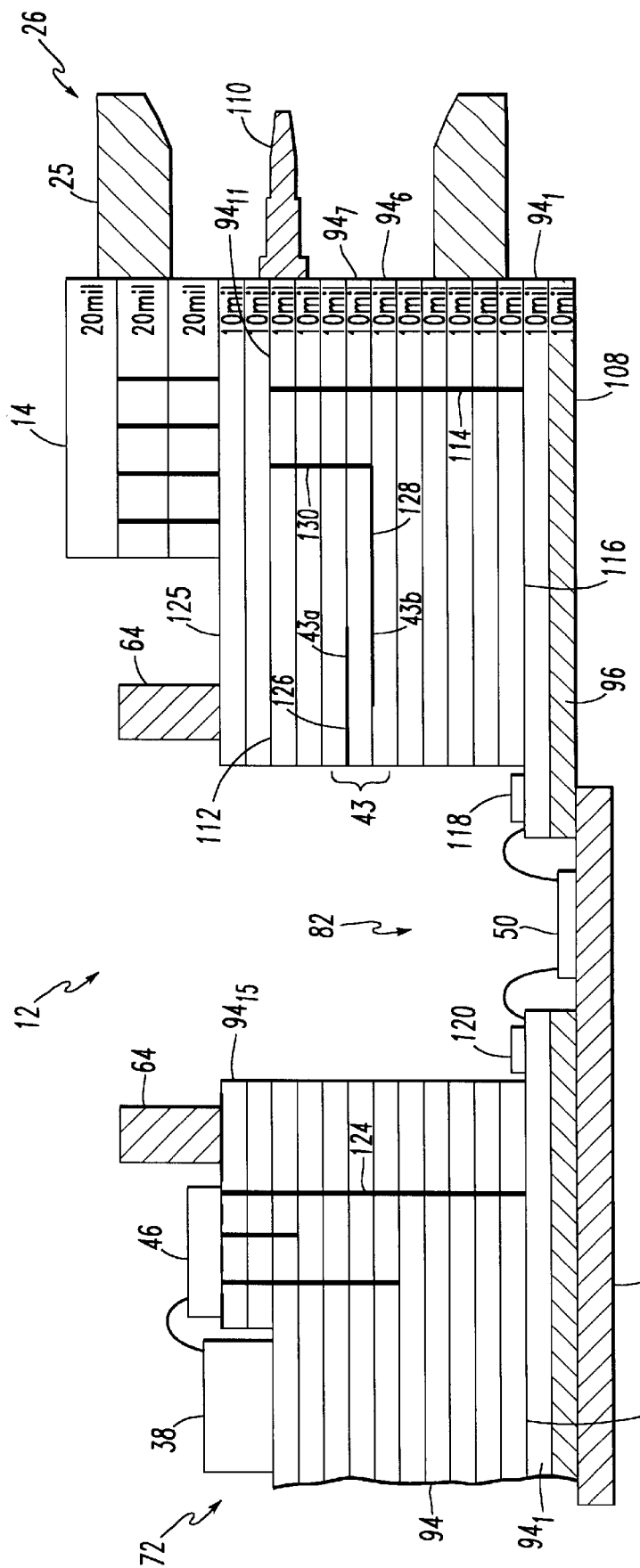
FIG. 8 is a diagram further illustrative of the HTCC ceramic layers located at the front portion of the T/R module along with patterns of ground and signal vias forming an RF transition between certain HTCC ceramic layers.

More particularly, the gate regulator 32, the FET switch 34 and the power controller 36 are located in a region 62 isolated by a gold plated sealing ring frame member 64 which is brazed to the surface of the substrate 12. The region 62, moreover, is located at the rear of the module 10. A relatively small cavity 65 and a relatively larger cavity 66 are located to one side of the isolated region 62 as shown in FIGS. 4A and 4D. A capacitor 67 is located in cavity 65 while the FET 34 is mounted in the cavity 66. Forward of the isolated region 62 are two intermediate rectangular isolated regions 68 and 70 which include respective cavities 72 and 74, which are again best shown in FIGS. 4A and 4D. The module controllers 38 and 40 are located in the cavities 72 and 74. The phase shifters 42 and 44 and the combined switch/attenuator/driver amplifiers 46 and 48 (FIG. 3) are located adjacent their respective module controllers 38 and 40 and are electrically coupled thereto by chip-to-chip wedgebonding, an example of which is shown in FIG. 8. Forward of the intermediate regions 68 and 70 are a pair of transversely oriented rectangular regions 76 and 78 including cavities 80 and 82 which accommodate the power amplifiers 50 and 52. Alongside of the regions 76 and 78 are located a pair of relatively smaller rectangular regions 84 and 86, including respective cavities 88 and 90 and in which the low noise amplifiers (LNA) 54 and 56 and the receiver protectors 58 and 60, as shown in FIG. 3, are located. These elements are furthermore shown interconnected in the electrical schematic diagram of FIG. 10 and which will be considered subsequently.

This configuration results, among other things, in moving the low noise amplifiers 54 and 56 forward toward the RF connector assembly 26, which while not appearing significant, actually results in a 25% improvement in RF received signal path losses. This also permits the power amplifiers 50 and 52 to be operated with less power, thereby enhancing the cooling capability of an array in which a large number of T/R modules are mounted and operated in unison.

As further shown in FIG. 3, when mounted to an antenna array, the T/R module 10 is typically fitted with six relatively short metallic tubular extensions $92_1, 92_2, \ldots 92_6$, one for each input/output port RX1 ... TX2. These extensions are normally inserted into the connector assembly 26 prior to or during the module's installation in an array and provide socket connection for the individual connector pins within the shroud 25 of the connector assembly 26 as well as acting as shielding devices and providing mechanical float tolerance therefor.

The substrate 12 within which the cavities 65, 66, 72, 74, 80, 82, 88 and 90 are formed is comprised of laminated layers 94 of alumina ceramic dielectric as shown in FIGS. 5, 6, 7 and 8 through which are located discrete patterns of metallization and vertical vias which implement the various signal lines within the T/R module 10. The various cavities are selectively formed so as to have a predetermined depth; however, it is significant to note that the forwardmost cavities 80 and 82 within which the power amplifiers 50 and 52 reside comprise open cavities in that they extend entirely through the substrate 12 to the heat sink plates 20 and 22 (FIG. 4E) as shown in FIG. 8.

Figure 4E:
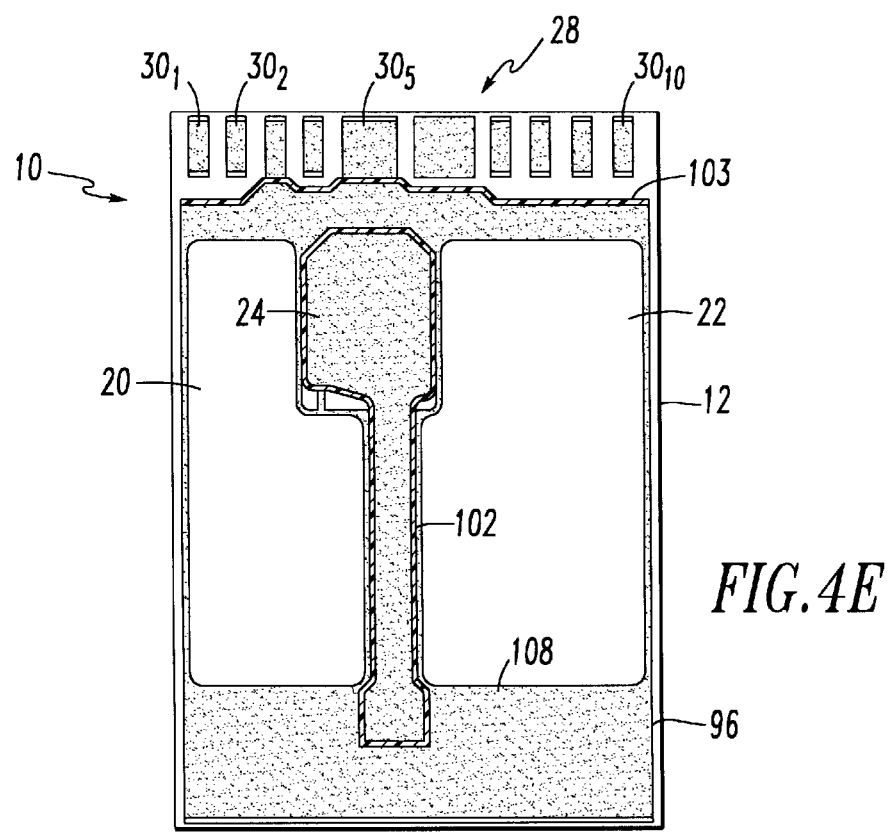
Figure 5:
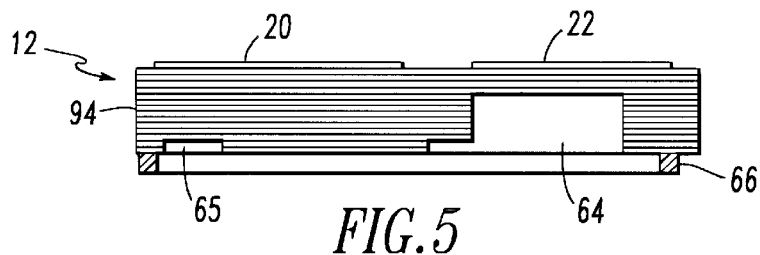
FIG. 5 is a cross-sectional view of the T/R module shown in FIG. 4A taken along the lines of 5—5.
Figure 6:
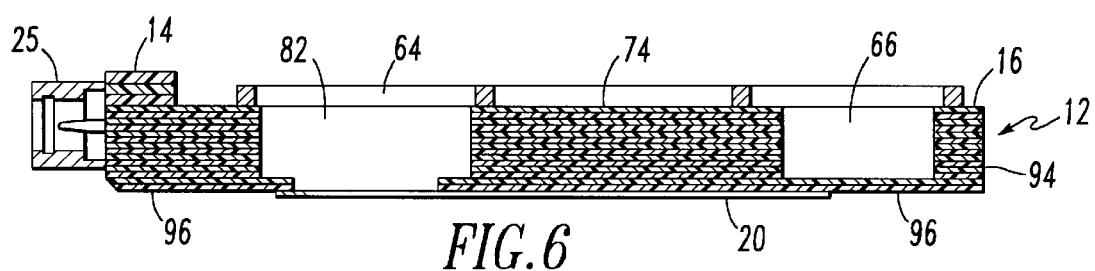
FIG. 6 is a longitudinal cross-sectional view of the T/R module shown in FIG. 4A taken along the lines of 6—6 thereof.
Figure 7:
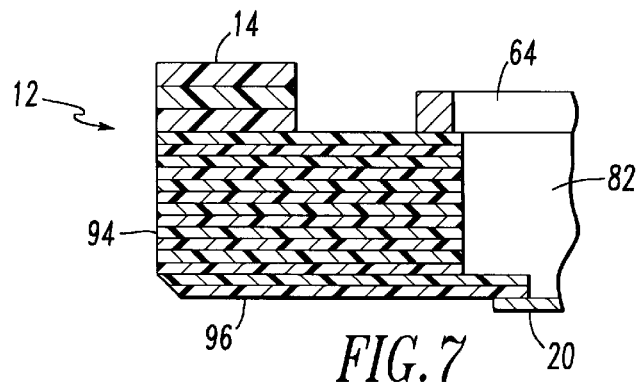
FIG. 7 is a partial cross-sectional view of the forward portion of the T/R module shown in FIG. 6 exclusive of the RF connector located thereat.

As shown in FIGS. 4B and 4E, the substrate 12 also includes a bottom RF ground plane layer 96 and an elongated bus bar member 24 having nickel plated tungsten (NiW) inner surfaces 98 and 100. Electrical conductivity of the ground plane layer 96 and the bus bar member 24 is enhanced by a braze material applied over the NiW. A border 102 of insulation surrounds the bus bar member 24 as shown in FIG. 4E. A strip 103 of insulation is also shown located on the rear edge of the ground plane layer 96. The ground plane layer also includes a pair of mutually adjacent rectangular openings or windows 104 and 106 as shown in FIG. 4B, so that when the baseplates 20 and 22 are bonded to the outer surface 108 of the ground plate 96 as shown in FIG. 4E, the power amplifiers 50 and 52 (FIG. 3) can be soldered directly to the exposed surface of the CuMo baseplate 20 and 22 as shown in FIG. 8.

FIG. 8 is additionally intended to depict the multi-level structure of the substrate 12 consisting of plural ceramic dielectric layers 94 within which are formed the cavities 65, 66 ... 88 and 90 as shown in FIG. 3, FIGS. 4A and 4D. FIG. 8 shows one of the MMIC power amplifiers 50 bonded to the baseplate 20 in cavity 82. The MMIC 50 is coupled between a TX1 connector pin 110 of the RF connector assembly 26 and a driver amplifier chip 46. This is achieved, for example, by means of a length of stripline metallization 112 formed on dielectric layer $94_{11}$, a vertical via 114 down to dielectric layer $94_1$, and a line of metallization 116 on dielectric layer $94_1$ which connects to a wire bond terminal 118 connected to the output side of the power amplifier 50. On the input side of the power amplifier 50 is a wire bond terminal 120 also on dielectric layer $94_1$ connected to stripline element 122 which connects to an ascending via 124 up to the top of dielectric layer $94_{15}$.

The three uppermost layers and vias of the substrate 12 shown at the right in FIG. 8 comprise what is referred to as "dummy" layers which include a ground plane layer 125 on a top portion of the substrate 12. The ceramic dielectric layers beneath the seal ring member 64 provide the ability to implement 3-D routing of both RF signals and DC signals within the substrate 12 as well as embedding a pair of RF manifold couplers 43 and 47 in a manner shown and described with respect to the parent application Ser. No. 09/158,829. One of the RF couplers, for example the transmit manifold coupler 43, is shown implemented by a pair of overlapping stripline conductors 126 and 128, with stripline conductor 128 being connected to stripline conductor 112 by means of a vertical via 130.

Chip-to-chip wedgebonding is utilized throughout the module 10 to connect the various MMICs and ASICs together. An example of this technique is shown by the interconnection of the module controller and driver amplifier chips 38 and 46 in FIG. 8.

Figure 9:
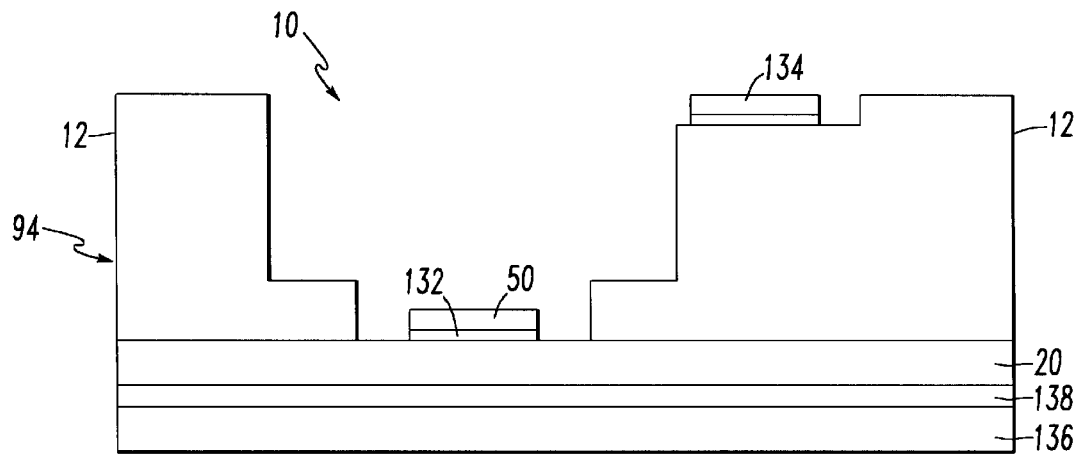
FIG. 9 is a diagram illustrative of chip bonding and the thermal coupling providing between the bottom heat sink plate of the T/R module and a coldplate.

Referring now to FIG. 9, this figure is intended to show that the power amplifiers 50 and 60 are attached, i.e. bonded to the CuMo coldplate 20 by means of a solder joint 132, while those semiconductor chips which are bonded to dielectric surfaces of the substrate 12 require a solder/epoxy combination 134. Also, FIG. 9 discloses that the T/R module 10 is typically mounted against a coldplate 136 of an antenna assembly such as shown and described in U.S. application Ser. No. 09/158,827 by means of a "thermstrate" member 138 which is comprised of a relatively thin sheet of aluminum foil coated with thermal wax on both sides and which aids in the attachment of the module 10 and the heat transfer to the coldplate 136 by eliminating air gaps therebetween.

Figure 10:
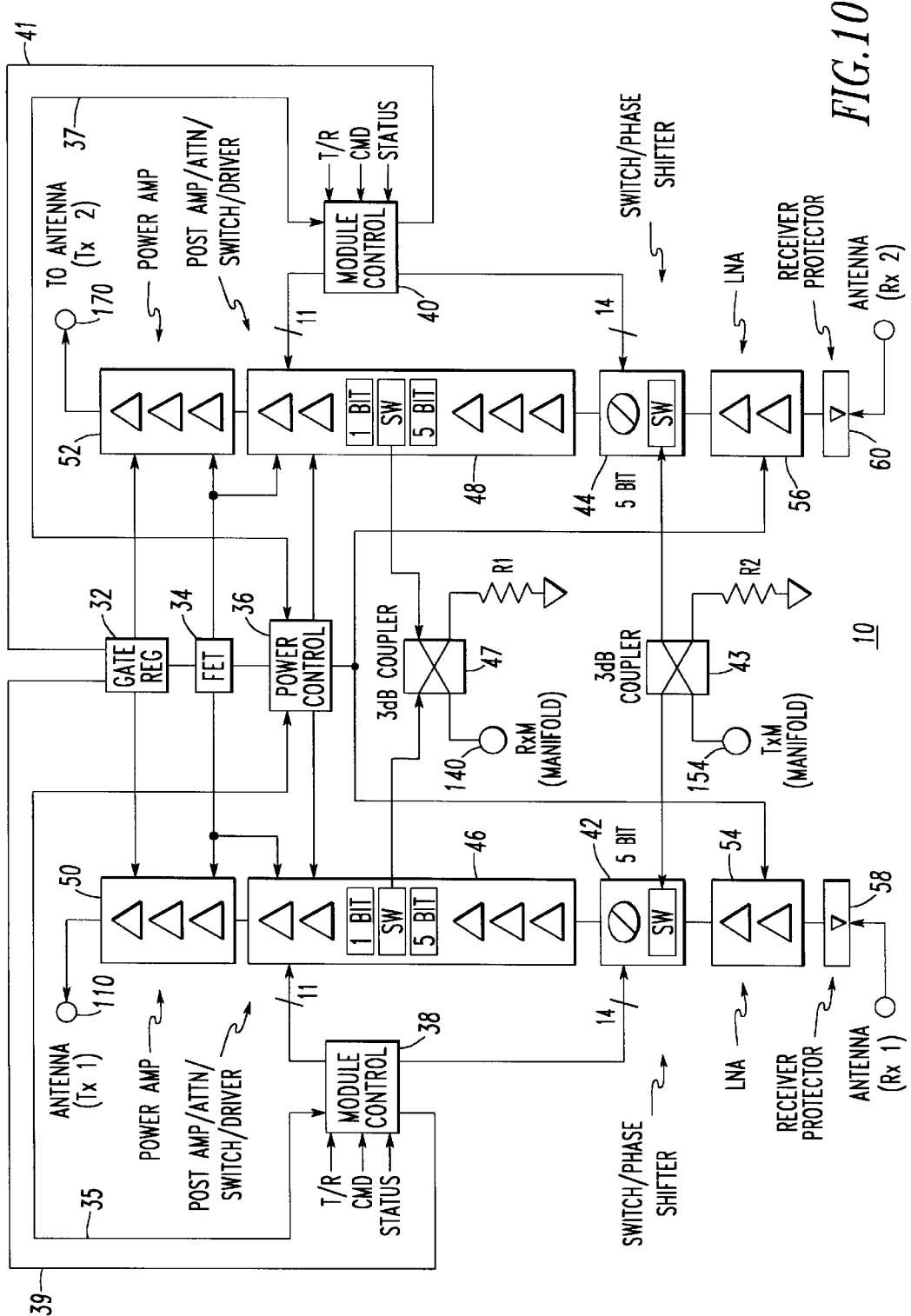
FIG. 10 is a simplified electrical block diagram of the dual channel T/R module circuit architecture which is implemented with the components shown in FIG. 3.

Referring now to FIG. 10, shown thereat is the electrical architecture of the dual channel T/R module 10. The circuitry for each channel is substantially like that shown and described in U.S. Pat. No. 5,745,076, Turlington et al. in that the same circuit components are respectively used in each channel for gain trim, phase shifting and intermediate power amplification during both the transmit and receive modes of operation. However, each channel operates independently of the other, while sharing in a unique manner not only the transmit and receive manifolds 5 and 6 (FIG. 1) by way of a pair of embedded couplers 43 and 47, but also the power and operation of the gate regulator 32, the FET switch 34, and the power controller 36.

Accordingly, and as shown in FIG. 10, each channel includes: a receiver protector MMIC 58, 60; low noise amplifier (LNA) MMIC 54, 56 including two stages of amplification; an RF switch and phase shifter MMIC 42, 44, including a single pole, double pole RF switch, not shown, and a digitally controlled phase shifter; a driver amplifier/gain trim attenuator/switch 46, 48, including three stages of pre-amp or post-amp amplification, a second single pole, double-throw switch located between a pair of digitally controlled gain trim attenuators and two stages of driver amplification; and power amplifier MMICs 50, 52 including three stages of RF power amplification.

Control signals are fed from the beam steering controller 9 (FIG. 1) to separate modular controller ASICs 38 and 40 so as to respectively provide phase and amplitude control over RF transmit and receive signals in the respective T/R channels. The module controllers 38, 40 preferably operate on a limited basis of shared module control via the power controller ASIC 36, by providing cross-over channel controls so that in the event that one of the modular controller fails, the other module controller takes over via digital signal lines 35 and 37. The module controllers 38 and 40 also feed control signals via digital signal buses 39 and 41 to the gate regulator 32 to adjust bias voltage over a predetermined range to accommodate the various types of electronic devices utilized in the system architecture. Further, either module controller 38 or 40 will shut down the entire module 10 upon the detection of certain conditions in order to prevent faulty module operation from adversely affecting the accuracy of overall beam control.

Figure 11:
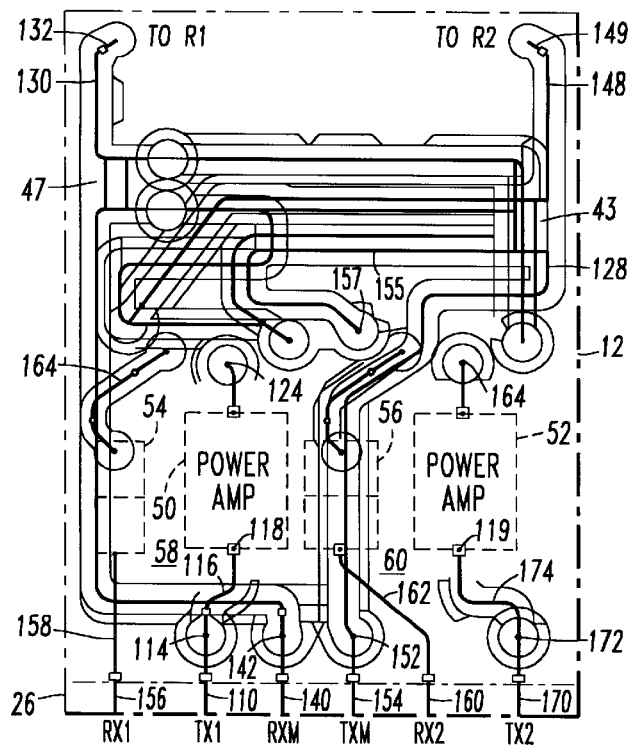
FIG. 11 is a composite electrical wiring diagram illustrative of the RF signal paths implemented within the T/R module.

Referring now to FIG. 11 and FIGS. 12A–12E, shown thereat are wiring diagrams illustrative of the RF signal paths within the dual channel T/R module 10, with FIG. 11 being a composite wiring diagram implemented at five different levels via stripline conductors as shown in FIGS. 12A–12E.

Figure 12A:
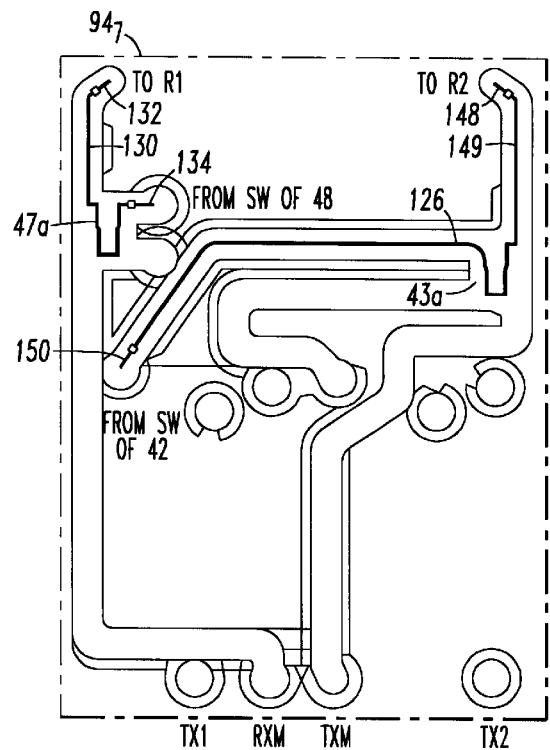
Figure 12B:
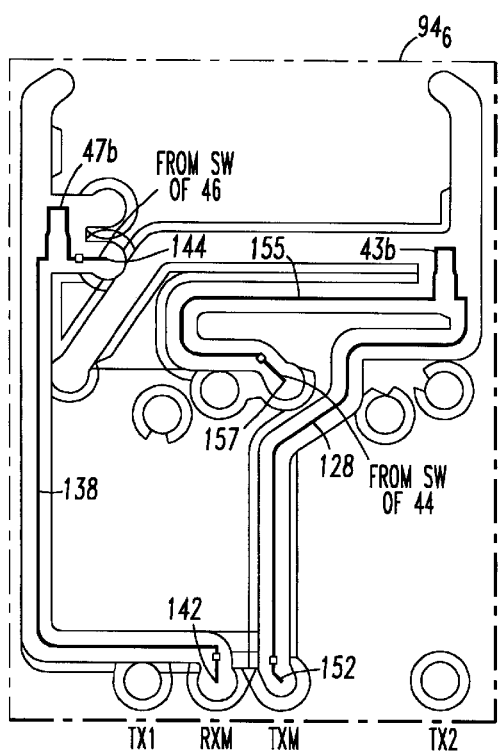

In FIGS. 12A and 12B, there is shown the implementation of the transmit manifold coupler 43 and the receive manifold coupler 47 (FIG. 10). The transmit manifold coupler 43 is implemented by a pair of overlapping U-shaped stripline conductor elements 43A and 43B which face in mutually opposite directions as shown in FIGS. 12A and 12B. In the same manner, the receive manifold coupler 47 is implemented by a pair of overlapping U-shaped stripline elements 47a and 47b. Further as shown in FIG. 12A, one side of the coupler element $47_a$ is connected to a fixed resistor R1 (FIG. 10) via stripline element 130 and a vertical via 132. The opposite end of the coupler element connects to a vertical via 134 which couples back to the switch of the postamp/atten/switch/driver chip 48 by means of a stripline element 136 shown in FIG. 12C. The other section $47_b$ of the receive manifold coupler 47 has one end connected to a length of stripline 138 as shown in FIG. 12B which connects back to connector 140 of the RF connector assembly 26 by means of a vertical via 142. This is shown in FIG. 12D. The opposite end of the coupler section $47_b$ connects to a via 144 which then connects to the switch portion of the postamp/atten/switch/driver 46 by means of a length of stripline 146 shown in FIG. 12C. With respect to the transmit manifold coupler 43, the upper section $43_a$ has one end connected to a grounded resistor R2 by means of stripline element 148, while its opposite end is connected to a vertical via 150 which connects to the switch portion of the switch/phase shifter 42 of FIG. 10. The other half $43_b$ of the transmit manifold coupler 43 is shown in FIG. 12B having one end coupled to a vertical via 152 by means of stripline element 128 where it connects to connector pin 154 shown in FIG. 11. The opposite end of coupler segment $43_b$ connects to a length of stripline 155 which connects to a vertical via 157, which in turn connects to the switch portion of the switch/phase shifter 44 of FIG. 10.

It can be seen with reference to FIG. 12D that one of the connector pins 156 of the connector assembly 26 comprises a connector pin for receiving RF energy in one of the channels of the T/R module 10 where it connects to the receiver protector (RP) 58 and the low noise amplifier (LNA) 54 by means of stripline element 158. A connector pin 160 for receiving RF energy for the second channel is connected to the receiver protector 60 and low noise amplifier 56 by means of the stripline element 162. It can also be seen with reference to FIG. 12D that the respective outputs of the low noise amplifiers 54 and 56 connect to the switch portions of the switch/phase shifters 42 and 44 by means of stripline elements 164 and 166.

With respect to the power amplifiers 50 and 52 in the transmit sections of the dual channel T/R module, it can be seen that power amplifier 50 connects to via 114 by means of stripline segment 116 where it connects to connector pin 110. The input side of the power amplifier 50 is connected to the driver 46 by means of input terminal 120, circuit lead 122 and via 124. In a like manner, the transmit power amplifier 52 for the second channel of the T/R module has its input connected to the driver 48 by means of a vertical via 164, stripline element 166, and input terminal 168. The output of the power amplifier 52 is fed to pin 170 by means of the via 172 which connects to stripline element 174 and output terminal 176.

In most instances where a length of stripline conductor is formed on the surface of a dielectric layer, it is accompanied by adjacent grounded stripline conductor members which run parallel to the RF stripline conductors and act as shields for the signal carrying conductors within the substrate as shown, for example, in FIG. 11.

Having thus shown and described what is at present considered to be the preferred embodiment of the invention, it should be noted that the same has been made by way of illustration and not limitation. Accordingly, in applying the invention, modifications and variations can be made by those skilled in the pertaining art without departing from the scope and spirit of the invention. It is intended, therefore, that the scope of the invention be defined by the claims appended hereto, and their equivalents.

What is claimed is:

1. A transmit/receive (T/R) module for an active aperture of a radar system, comprising:

a substrate having front and rear end regions;

an RF interface located at said front end region;

a DC/logic interface located at said rear end region;

a plurality of cavities formed in the substrate including a first pair of cavities extending entirely through the substrate and located immediately adjacent said RF interface at said front end region;

an elongated current carrying bus bar and a ground plane insulated therefrom located on the bottom of said substrate, said ground plane including a pair of apertures in registration with said first pair of cavities extending through said substrate;

a first and second heat sink plate secured to the substrate and the ground plane on either side of the bus bar;

a plurality of circuit components located on the substrate for implementing a dual channel T/R circuit;

said circuit components being arranged relative to one another so as to reduce RF signal loss within the module and having a first pair of RF signal amplifiers, one for each channel, respectively located in said first pair of cavities and mounted on said heat sink plates, said heat sink plates thereby providing a thermal interface to an external heat exchanger; and a second pair of RF signal amplifiers, one for each channel, located in a second pair of cavities of said plurality of cavities, said second pair of cavities also located immediately adjacent said RF interface at said front end region.

2. A T/R module according to claim 1 wherein said heat sink plates are bonded to the substrate and ground plane.

3. A T/R module according to claim 1 wherein said first pair of RF signal amplifiers are mounted directly on said heat sink plates.

4. A T/R module according to claim 1 wherein said first pair of RF signal amplifiers comprise transmit RF power amplifiers and said second pair of RF signal amplifiers comprise receive RF signal amplifiers.

5. A T/R module according to claim 1 wherein said bus bar and said ground plane include an outer surface of tungsten co-fired metallization.

6. A T/R module according to claim 5 wherein said outer surface of co-fired metallization includes nickel and braze material.

7. A T/R module according to claim 1 wherein the cavities of said first and second pairs of cavities are located side by side on said substrate.

8. A T/R module according to claim 1 wherein said substrate comprises a high or low temperature co-fired multi-layer ceramic structure.

9. A T/R module according to claim 1 and additionally including a ring frame member located on the top of the substrate and a top cover member located on the ring frame member for forming a sealed package and mutually isolating said plurality of cavities from each other.

10. A T/R module according to claim 9 wherein the ring frame member and top cover are respectively bonded to the substrate and top cover member.

11. A T/R module according to claim 1 wherein said RF interface includes a multi-pin RF connector for coupling RF signals to and from said T/R module.

12. A T/R module according to claim 11 wherein said RF connector includes a plurality of coaxial RF connectors arranged in a row across an end face of the substrate.

13. A T/R module according to claim 1 wherein said DC/logic interface includes electrical circuitry connected to the substrate for supplying DC power to said circuit components and operational logic control signals for said circuit components.

14. A package for a transmit/receive (T/R) module, comprising:
a common substrate for two discrete T/R channels, having a metallized bottom surface and being comprised of a plurality of laminated ceramic layers each having a predetermined pattern of electrical vias therethrough and a predetermined conductor pattern of metallization at least on one surface thereof for providing three dimensional routing of signals and power between the layers of the substrate, said substrate further including a plurality of multilevel cavity regions formed therein, and in which one or more circuit components are located therein for implementing a transmit/receive function for an active aperture of a radar system;
a ring frame member located on top of said substrate bordering a major portion of the outer periphery of the substrate as well as encircling said cavity regions;
a cover member located on said ring frame, said cover member enclosing and mutually isolating the cavity region from each other;
a metallized ground plane and a current bus bar located on an underside surface of the substrate,
a pair of heat sink plates secured to the ground plane on either side of said bus bar and covering at least an area on the bottom of said substrate including a first pair of said cavity regions and having a pair of cavities formed therein extending entirely through said substrate;
a second pair of cavity regions of said plurality of cavity regions and having a second pair of cavities formed therein along side of said first pair of cavity regions;
an RF interface including a plurality of discrete signal RF connectors located at one end of the substrate immediately adjacent both said pairs of cavity regions for independently coupling RF signals to and from both said T/R channels; and
a DC/logic interface at the opposite end of the substrate for receiving externally generated DC power and operational logic control signals for both said T/R channels.

15. A package according to claim 14 wherein said first pair of cavities include respective active circuit components therein implementing RF transmit power amplifiers, and wherein said power amplifiers are mounted on said heat sink plates.

16. A package according to claim 15 wherein said power amplifiers are mounted directly on said heat sink plates.

17. A package according to claim 15 wherein said second pair of cavities include respective active circuit components therein implementing RF receive amplifiers and receiver protectors.

18. A package according to claim 17 wherein said substrate includes a third pair of cavity regions located side by side adjacent one edge of said first and second pairs of cavity regions.

19. A package according to claim 15 wherein said first pair of cavity regions is of a first size and said second pair of cavity regions is of a second size less than said first size.

20. A package according to claim 18 wherein said third pair of cavity regions each include for each channel: a first active circuit component implementing an RF preamplifier in a transmit mode and postamplifier in a receive mode, a signal attenuator, a first RF switch element and an RF driver amplifier; a second active circuit component implementing another RF switch element and a phase shifter; and a third active circuit component implementing a module controller.

21. A package according to claim 20 wherein said third pair of cavity regions are of a third size, said third size being greater than said first and second size of said first and second pairs of cavity regions.

22. A package according to claim 20 wherein said substrate includes a transverse cavity region at said opposite end of said substrate adjacent one edge of said third pair of cavity regions.

23. A package according to claim 22 wherein said transverse cavity region includes: a fourth active circuit component implementing a gate regulator, a fifth active circuit component implementing a DC power controller, and a sixth active circuit component implementing a DC power switch element, said gate regulator, said DC power controller and said DC power switch element being commonly utilized by both said T/R channels, and wherein said module controller of each channel applies control signals to said gate regulator to adjust bias voltages over a predetermined range to accommodate the various types of devices utilized in the module.

24. A package according to claim 23 wherein said transverse cavity region at said opposite end of said substrate is of a fourth size greater than the respective sizes of said first, second and third pairs of cavity regions.

25. A package according to claim 23 wherein said RF transmit power amplifiers, said RF receive amplifiers, said receiver protectors, and said first and second active circuit components are comprised of MMICs.

26. A package according to claim 23 wherein said fourth and fifth active circuit components are comprised of ASICs.

27. A package according to claim 23 wherein said DC power switch element comprises a field effect transistor.

28. A package according to claim 14 and wherein said RF interface comprises an RF connector assembly including: a first pair of RF input and output connectors for one of said two T/R channels, a second pair of RF input and output connectors for the other of said T/R channels, an RF receive manifold connector for both said T/R channels, and an RF transmit manifold connector for both said T/R channels.

29. A package according to claim 28 wherein all of said connectors are linearly arranged side by side in a common shroud which extends across a front end portion of said substrate.

30. A package according to claim 29 wherein connectors comprise coaxial blind mate press-on connectors.

* * * * *